(12) United States Patent
Shimkus

(10) Patent No.: US 10,614,264 B2
(45) Date of Patent: Apr. 7, 2020

(54) ELECTRONIC SIGNING USING ACTION RESPONSIVE DOCUMENT COPY GENERATION

(71) Applicant: DocuSign, Inc., San Francisco, CA (US)

(72) Inventor: Glenn Shimkus, Naperville, IL (US)

(73) Assignee: DocuSign, Inc., San Francisco, CA (US)

(*) Notice: Subject to any disclaimer, the term of this patent is extended or adjusted under 35 U.S.C. 154(b) by 26 days.

(21) Appl. No.: 15/076,320

(22) Filed: Mar. 21, 2016

(65) Prior Publication Data

US 2016/0224523 A1 Aug. 4, 2016

Related U.S. Application Data

(63) Continuation of application No. 14/572,644, filed on Dec. 16, 2014, now Pat. No. 9,292,876.

(51) Int. Cl.
| | | |
|---|---|---|
| *G06F 17/00* | (2019.01) | |
| *G06F 40/166* | (2020.01) | |
| *G06Q 40/00* | (2012.01) | |
| *G06Q 30/06* | (2012.01) | |
| *G06Q 10/10* | (2012.01) | |

(Continued)

(52) U.S. Cl.
CPC .......... *G06F 40/166* (2020.01); *G06F 3/0482* (2013.01); *G06F 3/04842* (2013.01); *G06F 21/64* (2013.01); *G06F 40/117* (2020.01); *G06F 40/134* (2020.01); *G06F 40/197* (2020.01); *G06Q 10/10* (2013.01);

(Continued)

(58) Field of Classification Search
CPC ............................. H04L 9/3247; G06F 21/64
See application file for complete search history.

(56) References Cited

U.S. PATENT DOCUMENTS

| | | | |
|---|---|---|---|
| 6,671,805 B1 * | 12/2003 | Brown | .................. H04L 9/3247 713/170 |
| 6,796,489 B2 | 9/2004 | Slater et al. | |

(Continued)

FOREIGN PATENT DOCUMENTS

| | | |
|---|---|---|
| WO | WO-0057318 A1 | 9/2000 |
| WO | WO-0062220 A1 | 10/2000 |
| WO | WO-2016099583 A1 | 6/2016 |

OTHER PUBLICATIONS

"Making an editable PDF Form non-editable (a shortcut)" May 13, 2012, p. 1-12, retrieved from https://forums.adobe.com/thread/1004168.*

(Continued)

*Primary Examiner* — Amelia L Tapp
(74) *Attorney, Agent, or Firm* — Fenwick & West LLP

(57) ABSTRACT

A system, computer-readable storage medium, and computer-implemented method for signing a document involving generating copies of the document in response to receiving actions to perform on the document. In particular, a web service can transmit a document for signing to a client device such that the document is viewable through graphical user interfaces while the underlying content of the document remains non-editable by the client devices through the web service. Responsive to receiving actions, the web service can generate one or more copies of the document that may include modifications that correspond to the received actions.

19 Claims, 12 Drawing Sheets

(51) Int. Cl.
*H04L 9/32* (2006.01)
*G06F 21/64* (2013.01)
*G06F 40/117* (2020.01)
*G06F 40/134* (2020.01)
*G06F 40/197* (2020.01)
*G06F 3/0482* (2013.01)
*G06F 3/0484* (2013.01)

(52) U.S. Cl.
CPC ..... *G06Q 30/0609* (2013.01); *G06Q 30/0613* (2013.01); *G06Q 40/12* (2013.12); *H04L 9/3247* (2013.01)

(56) References Cited

U.S. PATENT DOCUMENTS

| | | | |
|---|---|---|---|
| 7,051,364 B1 | 5/2006 | Tackman et al. | |
| 7,185,202 B2 | 2/2007 | Philips | |
| 7,437,421 B2 | 10/2008 | Bhogal et al. | |
| 7,502,934 B2 | 3/2009 | Dietl | |
| 8,433,909 B1* | 4/2013 | Sakkos | G06Q 40/00 713/170 |
| 9,292,876 B1 | 3/2016 | Shimkus | |
| 9,779,063 B1* | 10/2017 | Dykema | G06F 17/211 |
| 9,953,019 B2 | 4/2018 | Shimkus | |
| 2002/0120648 A1 | 8/2002 | Ball et al. | |
| 2003/0078880 A1* | 4/2003 | Alley | G06F 21/645 705/38 |
| 2004/0093323 A1* | 5/2004 | Bluhm | G06F 17/30011 |
| 2006/0085738 A1* | 4/2006 | Chapus | G06F 17/2211 715/255 |
| 2007/0043949 A1 | 2/2007 | Bugbee et al. | |
| 2007/0201086 A1* | 8/2007 | Kim | H04L 51/00 358/1.15 |
| 2008/0072334 A1 | 3/2008 | Bailey et al. | |
| 2010/0161693 A1* | 6/2010 | Lee | G06F 17/30569 707/827 |
| 2011/0283177 A1 | 11/2011 | Gates et al. | |
| 2012/0086971 A1 | 4/2012 | Bisbee et al. | |
| 2013/0238966 A1* | 9/2013 | Barrus | G06K 9/00449 715/223 |
| 2014/0164255 A1 | 6/2014 | Daly et al. | |
| 2014/0222695 A1* | 8/2014 | Yang | H04W 4/18 705/311 |
| 2015/0195092 A1* | 7/2015 | Bartkiewicz | H04L 9/3247 713/176 |
| 2016/0020908 A1* | 1/2016 | Kundu | H04L 9/3247 713/176 |
| 2016/0239471 A1 | 8/2016 | Shimkus | |

OTHER PUBLICATIONS

"U.S. Appl. No. 14/572,644, Notice of Allowance dated Apr. 22, 2015", 19 pgs.

"U.S. Appl. No. 15/141,154, Preliminary Amendment filed Apr. 29, 2016", 11 pgs.

"Datasheet: Service R-PDF Forms Automation", RPost, Captured from Internet Archive Wayback Machine Sep. 26, 2013, 2 pgs.

"Datasheet: Service RSIGN TM Services: Legal E-Signatures", RPost, Captured from Internet Archive Wayback Machine Sep. 26, 2013, 2 pgs.

"Datasheets—Apps", RPost, captured from Internet Archive Wayback Machine Sep. 26, 2013, available at <https://web.archive.Org/web/20130926051401/http://www.rpost.com/resources/datasheets>, 2 pgs.

"International Application Serial No. PCT/US2015/013325, International Search Report dated Sep. 17, 2015", 2 pgs.

"International Application Serial No. PCT/US2015/013325, Written Opinion dated Sep. 17, 2015", 4 pgs.

"U.S. Appl. No. 15/141,154, Non Final Office Action dated Aug. 3, 2017", 11 pgs.

"International Application Serial No. PCT/US2015/013325, International Preliminary Report on Patentability dated Jun. 29, 2017", 6 pgs.

"U.S. Appl. No. 15/141,154, Notice of Allowance dated Dec. 19, 2017", 5 pgs.

"U.S. Appl. No. 15/141,154, Response filed Nov. 3, 2017 to Non Final Office Action dated Aug. 3, 2017", 10 pgs.

U.S. Appl. No. 14/572,644, now U.S. Pat. No. 9,292,876, filed Dec. 16, 2014, Systems and Methods for Employing Document Snapshots in Transaction Rooms for Digital Transactions.

U.S. Appl. No. 15/141,154, filed Apr. 28, 2016, Document Signing Using Action Responsive Secure Document Generation.

* cited by examiner

Document History

Date created: 12/1/2014
Owner: Bob Jones

| Action / Participant | Action Date |
| --- | --- |
| Document signed (View)<br>- by Sally Smith | 10/22/2014<br>4:39 PM |
| Document signed (View)<br>- by Ralph Adams | 10/20/2014<br>11:14 PM |
| Document modified (View)<br>- by Bob Jones | 10/18/2014<br>2:08 PM |
| Document Emailed<br>- by Joe Richardson | 10/16/2014<br>12:05 PM |
| Document modified (View)<br>- Joe Richardson | 10/16/2014<br>12:04 PM |
| Document signed (View)<br>- by Sally Smith | 10/16/2014<br>9:41 AM |
| Document Emailed<br>- by Bob Jones | 10/15/2014<br>3:20 PM |
| Document Created (View)<br>- by Bob Jones | 10/15/2014<br>3:15 PM |

NEXT    BACK

FIG. 4

Assign Participants to Signing Roles

| Signing Role | Participant Signing |
|---|---|
| Seller One | - Select Participant - ▾ |
| Seller Two | - Select Participant - ▾ |
| Listing Agent | - Select Participant - ▾ |
| Listing Broker | - Select Participant - ▾ |

NEXT   BACK

*FIG. 5A*

Assign Participants to Signing Roles

| Signing Role | Participant Signing |
|---|---|
| Seller One | Sally Smith (Seller) ▾ |
| Seller Two | - Select Participant - ▾ |
| Listing Agent | Bob Jones (Real Estate Agent) ▾ |
| Listing Broker | - Select Participant - ▾ |

NEXT   BACK

Warning – Unassigned Roles

The following signing roles do not have a participant associated with them. Would you like to proceed without having participants associated with these signing roles?

Signing Role

Seller Two

Listing Broker

[CONTINUE]  [BACK]

Warning – Unassigned Roles

The following documents require signatures for at least one signing role, but participants have not been associated with a required signing role. Would you like to proceed?

Documents

DOC_2

DOC_5

[CONTINUE]  [BACK]

*FIG. 6B*

Note that at least one document in this envelope is not pre-tagged for eSignature while others are pre-tagged. Please pay special attention to make sure all of the documents are tagged appropriately for eSignature before sending the documents out to be signed electronically.

| Document | Pre-tagged? |
|---|---|
| DOC_1 | |
| DOC_2 | Yes |
| DOC_3 | |
| DOC_4 | |
| DOC_5 | Yes |

CONTINUE   BACK

*FIG. 6C*

ELECTRONIC SIGNING USING ACTION RESPONSIVE DOCUMENT COPY GENERATION

This application is a Continuation of U.S. patent application Ser. No. 14/572,644, filed Dec. 16, 2014, which application is incorporated by reference herein its entirety.

FIELD OF THE INVENTION

The present disclosure relates generally to document management and more particular, but not exclusive, to managing editable and non-editable documents for review and electronic signature in a digital transaction service.

BACKGROUND

The use of electronic signatures to sign documents has greatly increased in the past few years. Electronic signatures can allow multiple parties in a transaction to efficiently sign documents from remote locations, while maintaining confidence that the party signing the document is the actual signer. These electronic signature systems, however, can limit the efficiency of a transaction when multiple edits are made to the signing documents during the transaction. Thus, it is with respect to these considerations and others that the invention has been made.

BRIEF DESCRIPTION OF THE DRAWINGS

Preferred and alternative examples of the present invention are described in detail below with reference to the following drawings. In the drawings, like reference numerals refer to like components throughout the various figures unless otherwise specified.

FIG. 4 shows an illustration of an example screenshot of a document's history in a transaction room;

FIGS. 5A and 5B show illustrations of example screenshots of the association of recipients and signing roles in a transaction room;

FIGS. 6A, 6B and 6C show illustrations of example screenshots of unassociated signing roles and corresponding documents in a transaction room;

DETAILED DESCRIPTION

Figure 1:
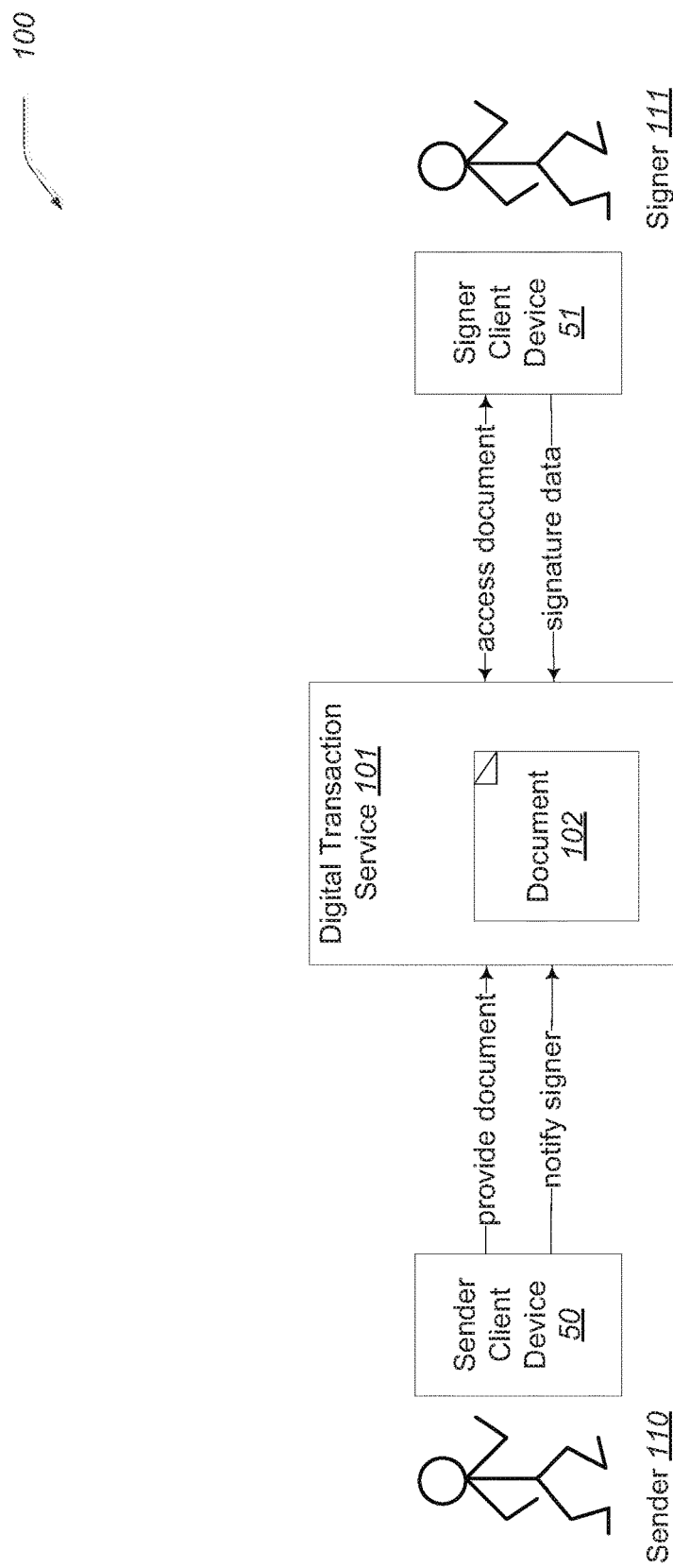
FIG. 1 is a block diagram of an example embodiment of a digital transaction service.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Briefly stated, embodiments are directed towards facilitating a digital transaction between at least two users. At least one document may be assigned or otherwise uploaded to a transaction room associated with an electronic signature service. The transaction room provides a plurality of participants controlled access to the at least one document based on a role of each of the plurality of participants. In some embodiments, the at least one document may be received from an owner participant at a first web service, wherein the at least one document is editable through the first web service. The at least one document may be linked to the transaction room at the electronic signature service, wherein the electronic signature service maintains non-editable copies of the at least one document, tags a copy of the document for signature, and provides the tagged document copy to at least one signing user.

In response to a document-snapshot trigger that is associated with a document of the at least one document, a first copy of the document may be created. In some embodiments, the document-snapshot trigger may be an action by a participant where a current copy of the document is obtained for performing at least one of faxing the current copy, emailing the current copy, or signing the current copy. The first copy of the document may be provided to at least one of the plurality of participants (i.e., one or more recipients) for review. In various embodiments, the first copy of the document is non-editable by the plurality of participants, while editability of the document is maintained in the transaction room (e.g., by the document owner).

In various embodiments, the document may be prepared for electronic signature via the electronic signature service. In some embodiments, when the document has changed after the first copy of the document was provided for review, a second copy of the document may be created and tagged for signature. In other embodiments, when the document has not changed after the first copy of the document was provided for review, the first copy of the document may be tagged for signature. In some embodiments, tagging the document copy for signature may include pre-tagging the document for at least one signature associated with at least one signing role, and tagging a copy of the document based on the signing user associated with the signing role in the pre-tagged document.

In some embodiments, it may be determined if the tagged document includes at least one pre-tagged signing role that is unassociated with a signing user. In response to this determination, a report may be provided to the user identifying the determination of an unassociated pre-tagged signing role. In some embodiments, a history of the document may be provided to a participant. The history may list each action associated with the document and a reference to a snapshot copy of the document obtained in response to a corresponding action. In at least one embodiment, deletion of the document may result in deletion of all document copies.

The brief description of the invention is intended to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detail description this is presented later.

Example Computing System Implementation

FIG. 1 is a block diagram of an example embodiment of a digital transaction service. In particular, FIG. 1 depicts a system 100 for facilitating electronic signatures between users. Digital Transaction Service (DTS) 101 that provides an electronic signature capability. The DTS 101 is utilized by a sender user 110 and a signer user 111 to facilitate an electronic signing of one or more recipients of a signature document.

The DTS 101 facilitates the creation of electronic signature documents and the association of electronic signatures therewith. In the illustrated scenario, the sender 110 operates a sender client device 50 in order to provide (e.g., upload, transmit) an electronic document 102 (e.g., an invoice, contract, purchase order, agreement) to the DTS 101. The sender 110 typically also provides additional information to the DTS 101, such as the identity or contact information (e.g., email address) of the signer 111, an indication of signature data (e.g., signatures, initials, dates) that are to be collected from the signer 111, and the like. The DTS 101 then securely stores the received document 102 and additional information.

The signer 111 then accesses the document 102. Typically, the sender 110 notifies the signer 111, such as by causing the DTS 101 to send to the signer 111 a message (e.g., an email) that includes a reference (e.g., a URL) or other indicator that can be used to access the document 102. The DTS 101 retrieves the document 102 from secure storage and provides it (or a representation thereof) to the signer client device 5) for presentation. The signer 111 operates a Web browser or other client module (e.g., mobile app) executing on the signer client device 51 to access and review the document 102. When the document 102 has been reviewed to the satisfaction of the signer 111, the signer attaches (or provides an indication or instruction to attach) his electronic signature to the document 102. Once the signing has been completed, the DTS 101 stores the document 102 in association with signature data and any other evidence of the signing that needs be retained, such as user information, timestamps, and the like.

Once the signer 111 has signed the document 102, the DTS 101 typically notifies the sender 110 that the document has been signed. For example, the DTS 101 may transmit (e.g., in an email) a URL, link, or other identifier of the document 102 to the sender client device 50. The sender 110 can then use a browser or other client logic executing on the sender client device 50 to access the signed document on the DTS 101.

The DTS 101 may perform other or additional functions. For example, the DTS 101 may provide a transaction room, as described herein, where participants can view, access, and edit documents assigned to the transaction room. The DTS 101 may maintain copies of documents based on actions associated with the documents such that snapshots of the document may be obtained to preserve the document as provided to a recipient of the transaction. The DTS 101 may also maintain pre-tagged documents such that upon association of a recipient with a signing role, the documents may be automatically tagged for electronic signature based on the signing roles of the pre-tags. In some embodiments, a template of a form may be created where the creator applies all of the eSign elements (e.g., sign, date, name, initials, or the like), which may be referred to as the pre-tags. Then, when the document is put into a transaction, the documents is matched with the template to get the eSign tags.

Figure 2:
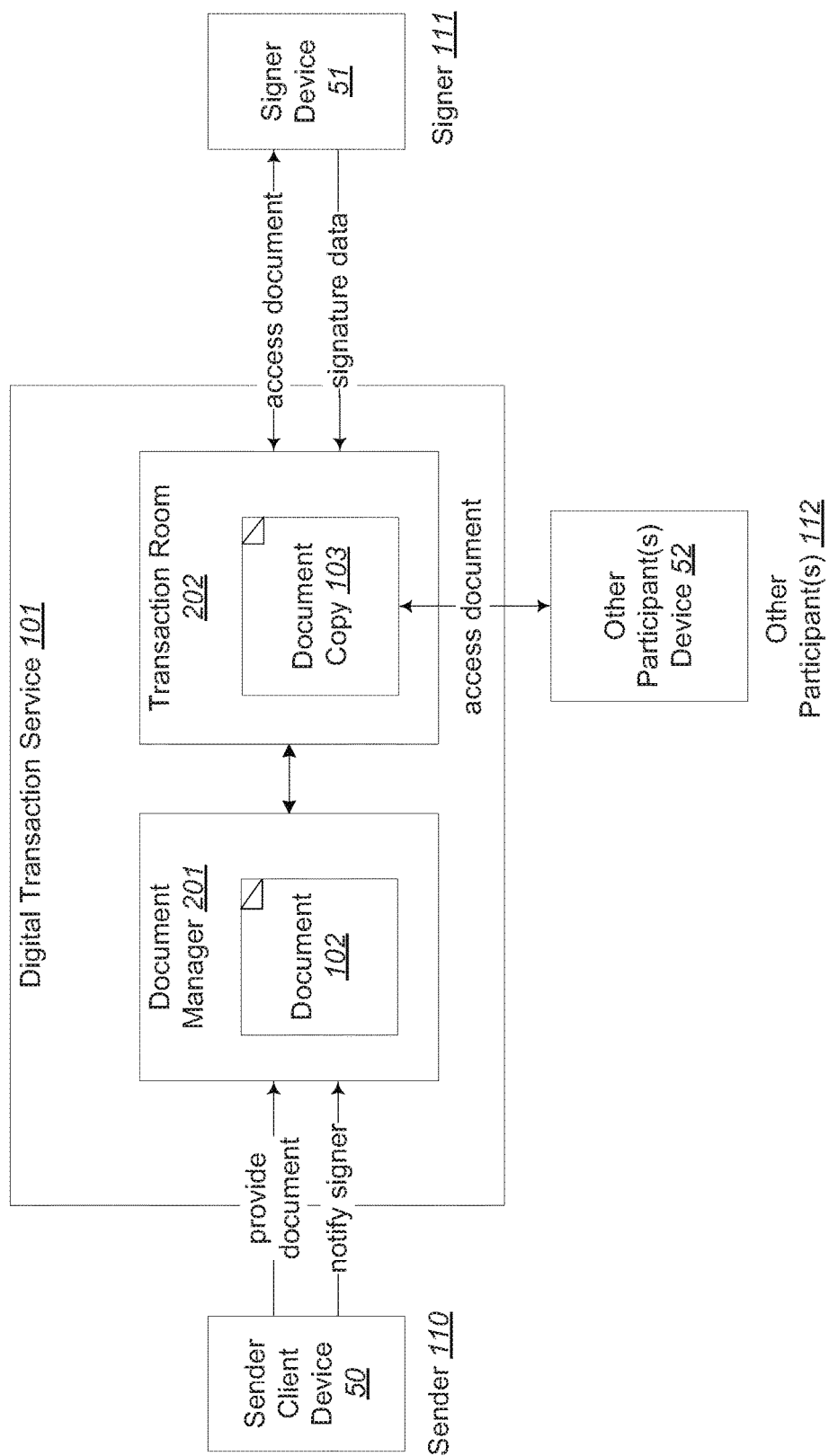
FIG. 2 is a block diagram of an alternative example embodiment of a digital transaction service.

FIG. 2 is a block diagram of an alternative example embodiment of a digital transaction service. System 200 may be an embodiment of system 100 of FIG. 1. In this alternative embodiment, DTS 101 may include a document manager 201 and a transaction room 202. The document manager 201 may be a service (e.g., a web-based service) that can enable one or more participants to create, view, access, and/or edit document 102. Although illustrated as a single document, document 102 may include a plurality of documents. In some embodiments, a document owner or other permitted participants may have access to the document manager 201, while some participants may not have access to document 102 in the document manager 201.

The transaction room 202 may be a service that enables one or more participants 112 to view, access, and/or edit documents for electronic signatures by one or more recipients. A participant operating other participant client device 52 in order to view and/or access documents. In various embodiments, the other participants 112 may include sender 110, signer 111, and/or other participants in the digital transaction who may or may not be sending or signing documents but still require access. For example, in the real estate transaction context, an office assistant in a real estate office may require access to documents related to the purchase and sale of a house (e.g., agreements, disclosures, notices), but would ordinarily not need the ability to send or sign such documents.

In various embodiments, a document owner may link document 102 from document manager 201 to the transaction room 202. In the transaction room, a participant can tag a document for electronic signature by one or more signers 111 (who may also be referred to as a recipient of a transaction). In some embodiments, a participant may be enabled to associate one or more participants (i.e., one or more recipients) with one or more signing roles. These signing roles may be employed to assign participants to particular electronic signature tags based on pre-tags and their corresponding signing roles.

As described herein, the document manager 201 may maintain editable versions of the documents (e.g., edit the content of the document), while the workspace 202 may maintain non-editable copies (e.g., cannot edit the underlying content of the document but can add, remove, or edit tags for electronic signatures) of the documents and update the copies accordingly. In various embodiments, the document manager 201 may be a transaction room with editable documents, while transaction room 202 may be a transaction room with non-editable document copies (e.g., prepared for electronic signature).

In particular, the transaction room 202 may make and maintain copies of the document 102, such as copy 103. Copies are created by the transaction room 202 in response to various types of triggering conditions. For example, an agent or broker acting as one of the participants 112 may make an edit to a purchase agreement, modifying the purchase price or some other term. When this purchase agreement is shared with, for example, the signer 111, the transaction room 202 creates and stores a copy of the purchase agreement as document copy 103. When the signer 111 accesses the shared document, the signer 111 will see the document copy 103, which reflects the state of the document 102 at the time it was shared or sent to be signed. Note that between the time the modified document was shared and the time at which the signer 111 accesses the document, the document 102 may have been again modified. In such a case, the signer 111 will also access the document copy 103, reflecting the state of the document 102 at the time it was shared, and not the current version of the document 102.

In some embodiments, the document manager 201 is hosted or operated by a party or organization that is distinct and/or separate from the party or organization that hosts the digital transaction service 101. For example, in a real estate transactions context, the document manager 201 may be hosted by a system that specializes in preparing and organizing real estate transaction forms, including purchase and sale agreements, broker agreements, disclosures, and the like.

Figure 3:
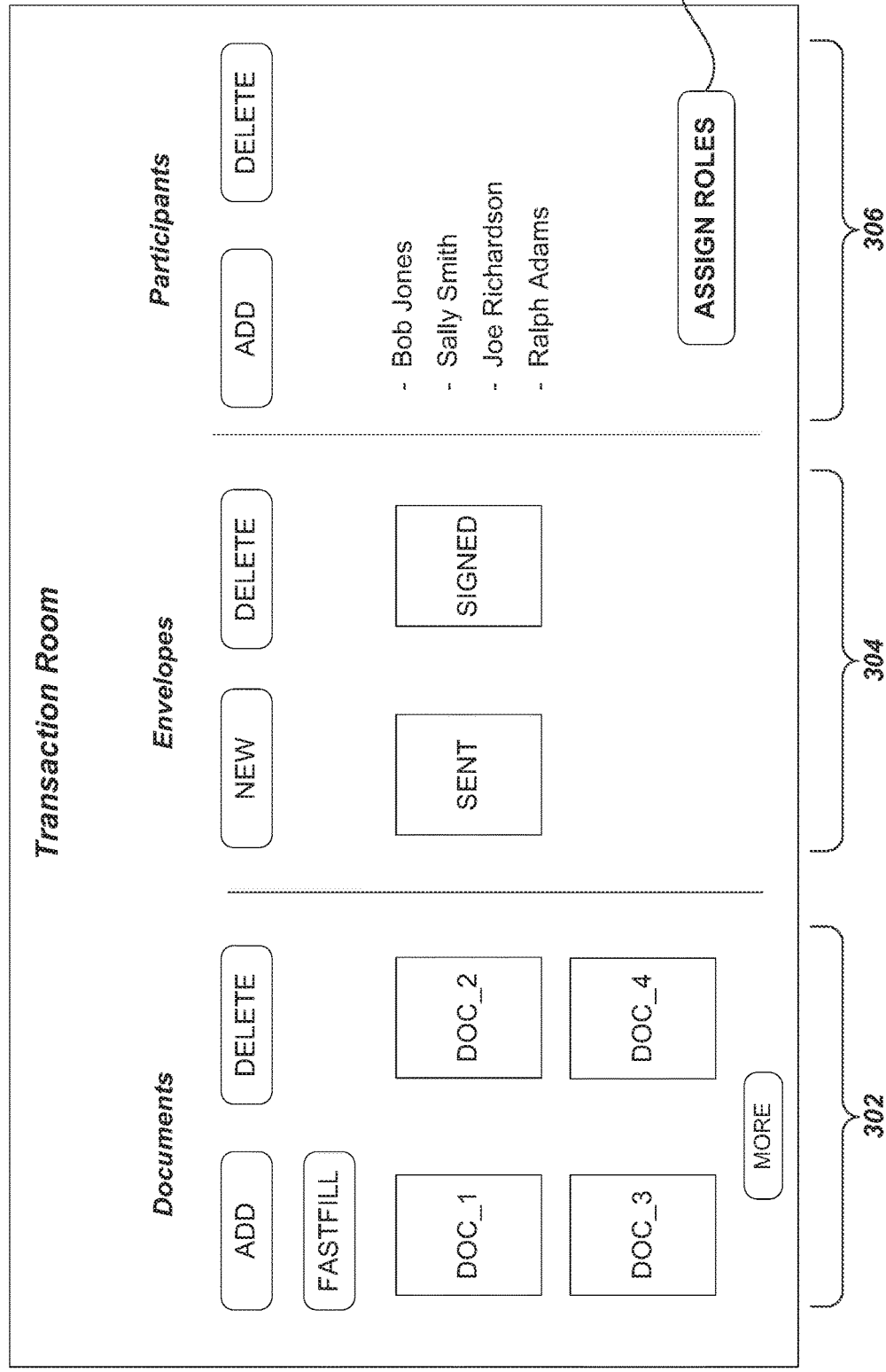
FIG. 3 shows an illustration of an example screenshot of a transaction room.

FIG. 3 shows an illustration of an example screenshot of a transaction room. Screenshot 300 may include a plurality of different types of information that may be accessible in a transaction room. For example, the transaction room may include documents 302, envelopes 304, and participants 306.

Documents 302 may include thumbnails of one or more documents that have been assigned to the transaction room. In various embodiments, a participant may be enabled to add or delete documents (noting that deleting may be reserved to an owner of the document or participants with particular permissions) or may access a document by clicking on the thumbnail. In some embodiments, if a participant deletes the document in its original location, then the backup copy and full history may be maintained in the transaction room. In other embodiments, deletion of the document results in deletion all document copies.

In at least one embodiment, a participant may be enabled to fast fill documents based on previously provided information. In some embodiments, clicking on a document thumbnail may open a window or screen that shows a history of actions on a document (e.g., as shown in FIG. 4). In other embodiments, clicking on the document thumbnail may open the document, which, in some embodiments, may include additional action buttons (e.g., view activity or view history of actions).

Envelopes 304 may include thumbnails of one or more envelopes of documents prepared for electronic signature by one or more recipients (who are participants in a transaction room). Envelopes are used to manage files, such as documents, associated with a digital transaction. In at least one embodiment, an envelope is a an electronic container (e.g., data structure, record) that is used to organize documents and related information (e.g., sender and signer identity information, signature event information) for purposes of gathering electronic signatures for a transaction. In various embodiments, a participant may be enabled to add or delete envelopes (noting that deleting may be reserved to an owner or creator of the envelope) or may access an envelope by clicking on the thumbnail.

Participants 306 may include a list of each participant in the transaction room. In various embodiments, each participant may have one or more permissions regarding which documents and/or envelopes they can access, add, delete, edit, or the like.

In some embodiments, one or more participants may be assigned or otherwise associated with one or more signing roles. These participants may be referred to as recipients. Clicking on button 308 may open another window or webpage such that the participants can be associated with signing roles, such as the examples shown in FIGS. 5A and 5B.

FIG. 4 shows an illustration of an example screenshot of a document history in a transaction room. As described herein, a copy of the document may be maintained based on an action associated with the document. Example 400 illustrates a list of previous actions for a particular document. The example includes a plurality of actions 402 that have been performed on the document by various participants in the transaction room. Based on the action, a copy of the document may be maintained, such that it can be accessed later (e.g., by click on the "view" link) by the document owner. For example, if the document has changed since it was last copied, a new current copy may be obtained and made accessible in the document's history.

FIGS. 5A and 5B show illustrations of example screenshots of the association of participants and signing roles in a transaction room. Examples 500A and 500B of FIGS. 5A and 5B, respectively, may enable a participant to establish or associate participants with one or more signing roles. For example, pull-down menus 504 may enable the participant to select which participant is associated with which signing role 502. In some embodiments, permissions of the participants may indicate which participants assign signing roles to other participants. In at least one embodiment, once a participant is associated with a signing role, it may list that participant and may include a transaction room role.

FIGS. 6A, 6B and 6C show illustrations of example screenshots of unassociated signing roles and corresponding documents in an envelope within a transaction room. As described herein, a document may be pre-tagged for one or more signing roles. If a pre-tagged signing role is not associated with a participant (e.g., as shown in FIG. 5B), then a list of unassociated signing roles may be listed, which is illustrated in FIG. 6A.

In an alternative embodiment, the documents that have unassociated pre-tag signing roles may be listed. FIG. 6B shows one example of such a list. In yet another alternative embodiment, as illustrated in FIG. 6C, lists each document in the transaction room and whether or not it has been pre-tagged for eSignature. The list of documents may be generated once the document is added to an envelope that is pre-tagged for eSignature.

Example Processes

The operation of certain aspects of the invention will now be described with respect to FIGS. 7-9. In at least one of various embodiments, processes 700, 800, or 900 of FIGS. 7-9, respectively, may be implemented by and/or executed on one or more computers, such as computing system 10 of FIG. 10 or other network computers or device. Additionally, various embodiments described herein can be implemented in a system such as system 100 of FIG. 1 and/or system 200 of FIG. 2.

Figure 7:
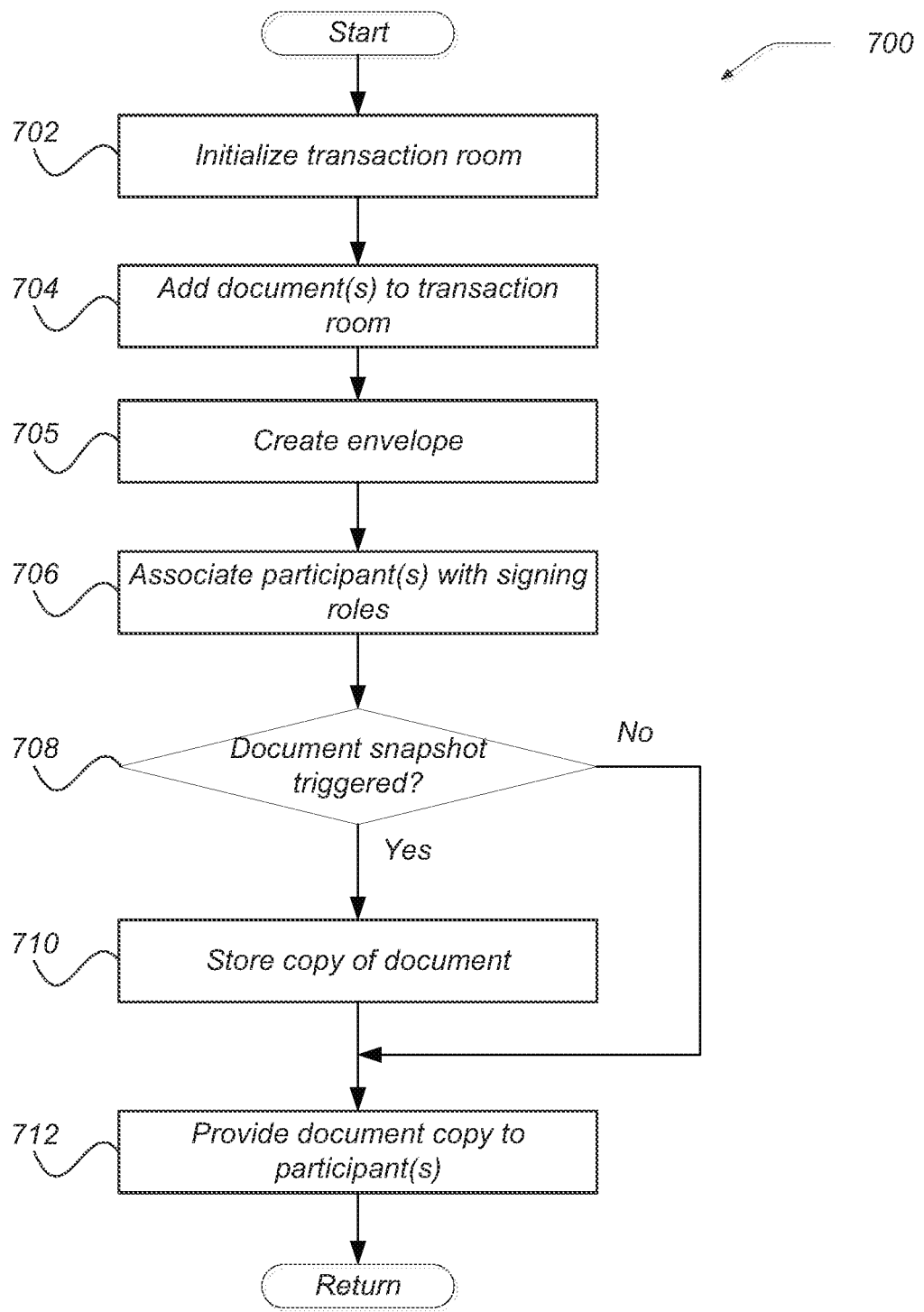
FIG. 7 illustrates a logical flow diagram generally showing one embodiment of an overview process for managing document snapshots in an electronic signature system to provide copies of documents to one or more recipients for review and/or signature.

FIG. 7 illustrates a logical flow diagram generally showing one embodiment of an overview process for managing document snapshots in a digital transaction service (e.g., DTS 101 in FIG. 1 or 2) to provide copies of documents to participants for review and/or signature. Process 700 begins, after a start block, at block 702, where a transaction room may be established.

In at least one of various embodiments, a plurality of participants may be identified as having controlled access to the transaction room and/or documents within the transaction room. In some embodiments, participants may be limited with respect to which documents they can access and/or edit based on preferences, parameters, or other characteristics of the transaction room, document, or participant.

Process 700 proceeds to block 704, where one or more documents may be assigned to a transaction room. In some embodiments, a participant of the transaction room may be enabled to upload a document to the transaction room. This participant is referred to as the owner of the document. In some embodiments, only certain participants may be enabled to upload documents, while other participants can only view or access documents already assigned to the transaction room.

In various embodiments, the transaction room may be maintained by a digital transaction service that provides an electronic signature service. In at least one embodiment, the documents in the transaction room (e.g., transaction room 202 in FIG. 2) may be linked to the electronic signature service from another web-based service (e.g., a document manager 201 in FIG. 2). In at least one such embodiment, the other web-based service may maintain editable versions of the documents, while the electronic signature service may maintain copies of the documents and update the document copies as described herein. Embodiments, however, are not so limited and a single electronic signature service may maintain editable and non-editable versions of the documents.

Process 700 proceed to block 705, where an envelope is created. In some embodiments, one or more documents may be added or otherwise included in the envelope for review or signature by one or more participants.

Process 700 proceeds to block 706, where one or more of the participants may be associated with one or more signing roles. In some embodiments, the signing roles may include those participants that may be enabled to review or electronically sign one or more documents within an envelope of a digital transaction.

Process 700 may continue at decision block 708, where a determination may be made whether a document snapshot trigger has occurred or been received. In various embodiments, a document snapshot trigger may be based on an action performed by a participant, which may include, but is not limited to, accessing a document, saving a document, closing a document (e.g., after an edit or modification to a document), sharing a document, emailing a document, faxing a document, or the like, or some combination thereof. In some embodiments, some actions may trigger a document snapshot, while other actions may not. If a document snapshot trigger has occurred, then process 710 may proceed to block 710; otherwise, process 700 may flow to block 712.

At block 710, the process may store a copy of the document. In at least one of various embodiments, the document copy may be a PDF document, image of the document, or the like. In various embodiments, the document copy may be non-editable by the participants in the transaction room, while the original document is maintained in an editable form. For example, assume the document snapshot trigger is a document modification. If a participant modifies a document (e.g., at a web-based service that is linked to the transaction room in the electronic signature service), then the electronic signature service may store a copy of the document. In another example, assume the document snapshot trigger is sharing a document. If a participant shares a document, such as by sending a link to the document (e.g., for review and/or electronic signature), then the electronic signature service may store a copy of the document and may share a link to the document copy. In this way, the recipient of the shared document has access to the stored copy. And even if further modifications are made to the document, the recipient will still see the version of the document that was shared with the recipient.

If no document snapshot trigger has occurred or after block 710, the process proceeds to block 712, where the document copy may be provided to one or more participants. In some embodiments, the document copy may be provided to the participant for review. In other embodiments, the document copy may be prepared for electronic signature by one or more of the participants. In at least one such embodiment, the document copy may be tagged for electronic signature. In various embodiments, the document copy may be provided to the participants by various means, such as fax, email, links, or the like. As described herein, the link may point or otherwise reference the document copy so that modification to the document do not affect the version provided to the participant.

After block 712, process 700 terminates and/or returns to a calling process to perform other actions.

Figure 8:
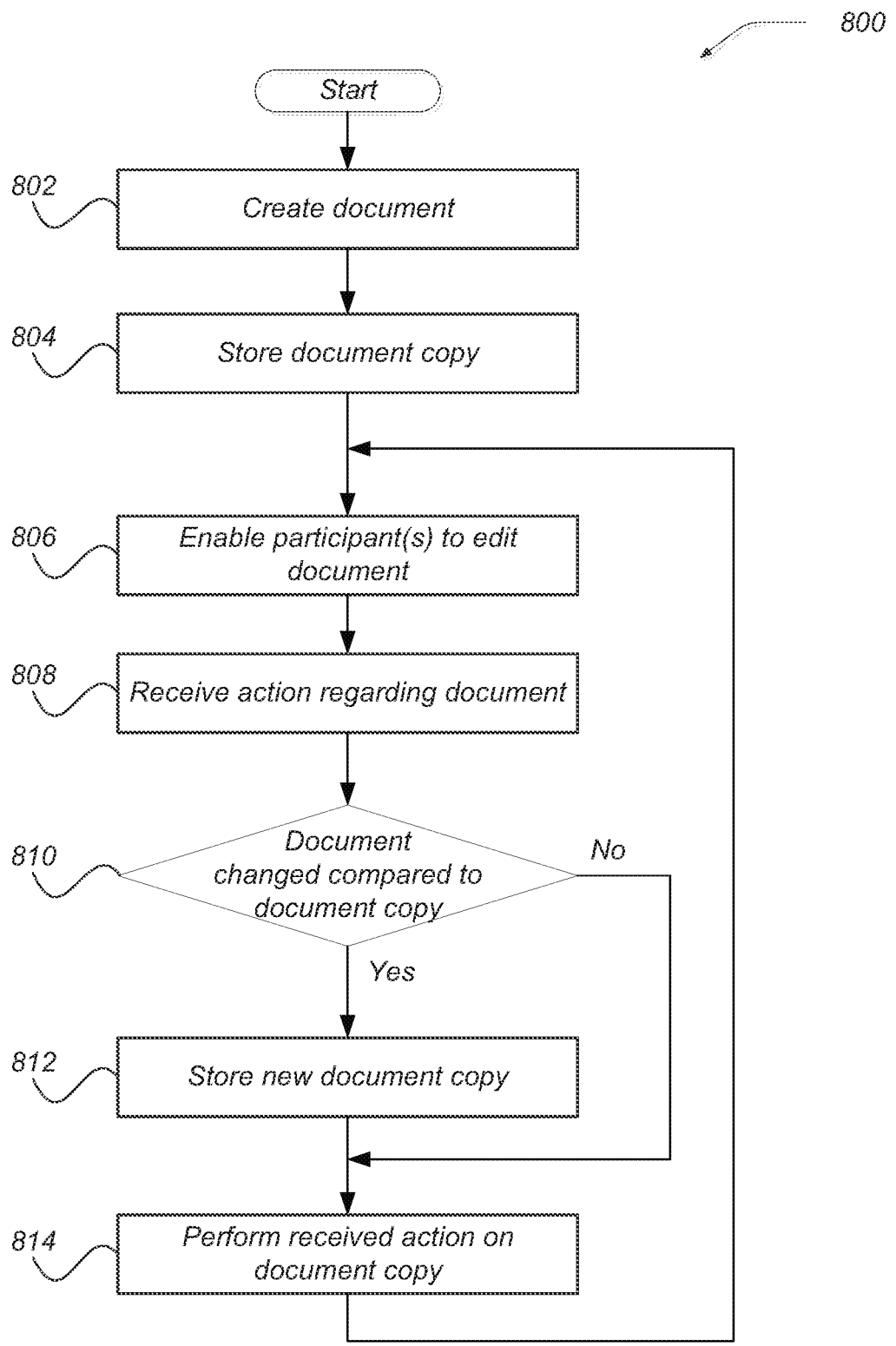
FIG. 8 illustrates a logical flow diagram generally showing one embodiment of a process for storing copies of documents in an electronic signature system based on document snapshot triggers.

FIG. 8 illustrates a logical flow diagram generally showing one embodiment of a process for storing copies of documents in an electronic signature system based on document snapshot triggers. Process 800 begins, after a start block, at block 802, where a document may be created in a transaction room. In various embodiments, a document may be created by uploading a document to a transaction room. In other embodiments, a document may be obtained from a catalog or library of documents and added to the transaction room.

As described herein, a first web-based service may manage editable documents of a transaction room and an electronic signature service may maintain copies of documents prepared for signatures by recipients of an envelope of the transaction room. So, a participant may create a document by uploading or adding the document to the first web-based service and then linked to the transaction room maintained by the electronic signature service. It should be understood that the documents may also be uploaded or added directly to the transaction room in the electronic signature service.

Process 800 proceeds at block 804, where a first copy of the document may be stored. In at least one of various embodiments, this copy of the document may be referred to as a current copy (or current version) of the document.

In various embodiments, the electronic signature service may obtain a copy of the document and store the first copy in a format that is non-editable by the participants of the transaction room. It should be noted, however, that a non-editable document copy refers to a document whose content cannot be altered, but that additional content and/or metadata can be added to or associated with the document. The added content, for example, may include one or more tags for one or more participants to sign, add a date, input information (e.g., a name, email address, title, or the like), check boxes, radio buttons, or the like. In at least one of various embodiments, the added content may overlay, but not replace or alter, the underlying content (thus considering the document copy non-editable).

Process 800 proceeds to block 806, where one or more participants may be enabled to edit the document. In a preferred embodiment, the document be only be editable by the document owner. In various embodiments, the original document may be edited, such as by adding, removing, or modifying content of the document. In at least one of various embodiments, editing the document may not alter or change the stored document copy. In some embodiments, one or more of the participants may have permission to access and edit the document, while one or more other participants may not have permission to edit the document, but can access and view the document. In at least one embodiment, only the document owner can edit the document and other participants can access the document.

Process 800 continues at block 808, where an action regarding the document may be received. In various embodiments, the received action may be associated with a document snapshot trigger. Such actions may include, but are not limited to, changing the document, viewing the document, faxing the document, emailing the document, sharing the document (e.g., through a link), or the like.

Process 800 then proceeds to decision block 810, where a determination may be made whether the document has changed compared to the stored document copy. In at least one embodiment, this comparison may be performed by one or more document change recognition techniques. If the document has changed, then process 800 flows to block 812; otherwise, process 800 flows to block 814.

At block 812, a new copy of the document may be obtained and stored. In at least one of various embodiments, block 812 may employ embodiments of block 804 to store a copy of the document. In various embodiments, this new copy of the document may become the current copy (or current version) of the document and the previous copy (as stored at block 804) may be archived.

In some embodiments, the new copy may be stored such that it corresponds to the action that triggered its creation. For example, an action history may be maintained (e.g., as shown in FIG. 4), such that each action that triggered a new copy of the document to be obtained may contain a link (or other reference) to that particular new copy of the document.

Process 800 then proceeds to block 814, where the received action may be performed on the document copy. For example, if the action is to send a link of the document to a participant for the participant to electronically sign the document, then the current copy of the document may be prepared and tagged for electronic signature by the participant. The tagged copy of the document may then be provided to the signing participant, such as by fax, email, a link, or the like.

After block 814, process 800 may loop to block 806 to continue to enable one or more participants (e.g., the document owner) to edit the document. Again, the original document may be maintained in an editable form, and copies of the document may be separately maintained for providing to participants for review, signature, or the like.

Figure 9:
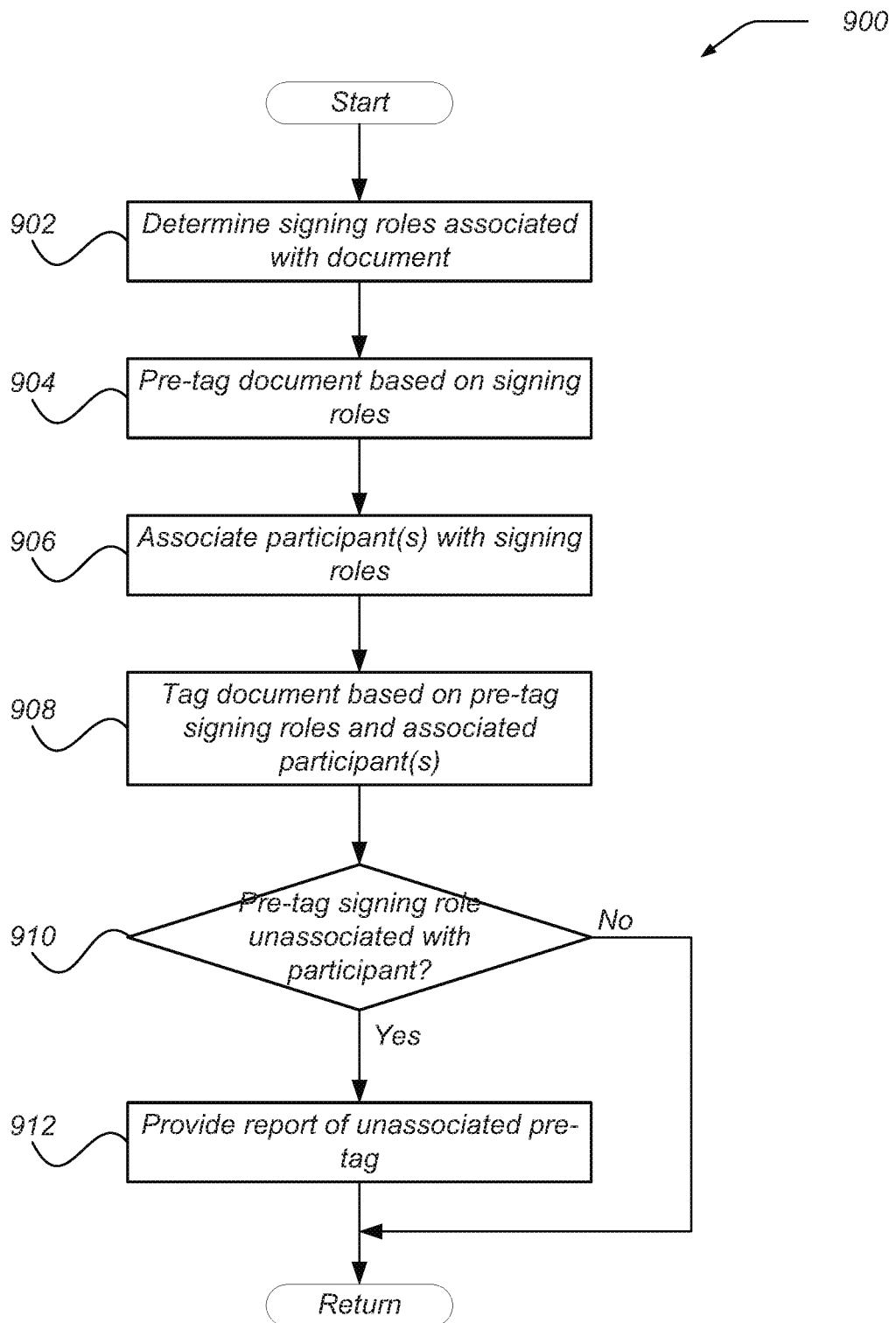
FIG. 9 illustrates a logical flow diagram generally showing one embodiment of a process for auto-tagging a copy of a document for electronic signature based on a pre-tagged document and associated signing roles.

FIG. 9 illustrates a logical flow diagram generally showing one embodiment of a process for tagging a copy of a document for electronic signature based on a pre-tagged document and associated signing roles. Process 900 begins, after a start block, at block 902, where one or more signing roles for a document may be determined.

In various embodiments, each document in a transaction room may require one or more participant signatures. Each signature that is required for a document may be associated with a signing role. For example, in real estate transfers, a sales agreement document may require both a seller and a buyer to sign. In this example, the sales agreement document may have a seller signing role and a buyer signing role associated with the document. In some embodiments, the signing roles may be predetermined based on the type of document, provided by a participant (e.g., an owner of a document), selected from a list of signing roles, or the like. These signing roles may be associated with a document when the document is created and/or assigned to a transaction room.

Process 900 proceeds to block 904, where the document may be pre-tagged. In various embodiments, a tag identifying the visible location in a document for a signature to be placed may be added to the document based on the signing roles. For example, the real estate sales agreement document may include a seller's signature line and a buyer's signature line. The document may be pre-tagged with a signing role for the seller on the seller's signature line and a signing role for the buyer on the buyer's signature line.

Process 900 continues at block 906, where a participant in the transaction room may be associated with a signing role. In some embodiments, each participant may correspond to a separate signing role. However, it should be recognized that some participants may not be associated with a signing role, but may still be a participant in the transaction room. For example, an attorney of the buyer may be a participant in a transaction room and can access to view documents, but may not be associated with a signing role. In yet other embodiments, a participant may be associated with a plurality of signing roles and/or a signing role may be associated with a plurality of participants.

The process 900 then flows to block 908, where the document may be tagged for electronic signature based on the pre-tag signing roles and their associated participants. In at least one of various embodiments, a copy of the document, as described herein, may be tagged for electronic signature. This automatic tagging may be performed based on the pre-tag placement, its corresponding signing role, and the participant associated with the signing role. For example, the document may be tagged for the seller to electronically sign the real estate sales agreement each place the document was pre-tagged with the seller signing role. If a signing role does not have an associated participant, then the tagged document may not include a tag for the pre-tag of the unassociated signing role.

Process 900 then proceeds to decision block 910, where a determination may be made whether there are any pre-tagged signing roles with unassociated participants in the tagged document. In various embodiments, this determination may be made based on a determination of which pre-tags do not have an associated participant and are thereof not included in the tagged document. So, if the document includes a pre-tag for a signing role and there is no participant associated with that signing role, then the resulting tagged document may not include a tag for that corresponding pre-tag. However, if each pre-tag has an associated participant, then the tagged document may include tags for each pre-tag so there are no unassociated pre-tag signing roles. If a pre-tag signing role is unassociated with a participant, then process 900 flows to block 912; otherwise process 900 terminates and/or returns to a calling process to perform other actions.

At block 912, a report may be generated and provided to a user indicating the unassociated pre-tag. In some embodiments, the report may include a list of each document that has pre-tags with signing role that are unassociated with a participant, such as illustrated in FIG. 6B and/or 6C. In other embodiments, the report may include a list of each signing role that is unassociated with a participant, but has a corresponding pre-tag in the document, such as illustrated in FIG. 6A.

After block 912, process 900 terminates and/or returns to a calling process to perform other actions.

Figure 11:
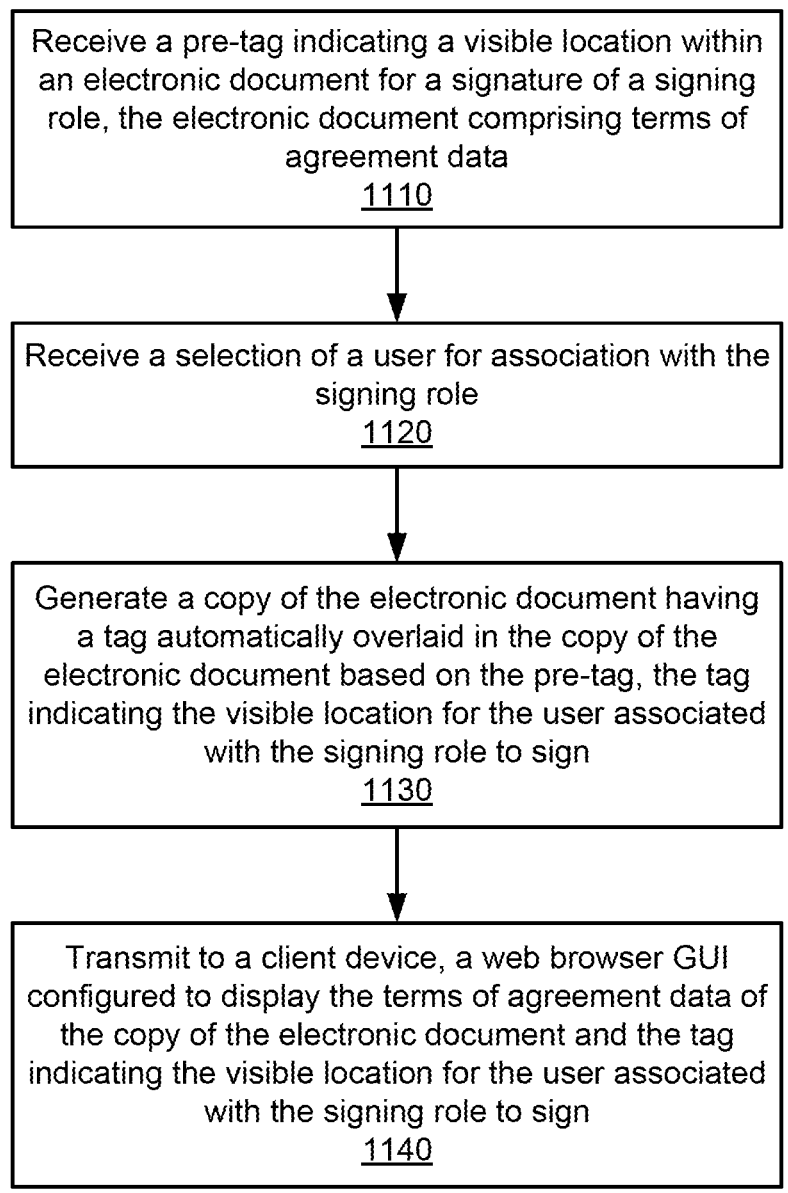
FIG. 11 illustrates a logical flow diagram generally showing one embodiment of a process for generating a copy of a document having a tag automatically overlaid in the copy of the electronic document based on a pre-tag.

FIG. 11 illustrates a logical flow diagram generally showing one embodiment of a process for generating a copy of a document having a tag automatically overlaid in the copy of the electronic document based on a pre-tag. Process 1100 begins at block 1110, where one or more servers receive a pre-tag-indicating a visible location within an electronic document for a signature of a signing role, the electronic document comprising terms of agreement data.

Process 1100 continues to block 1120, where the one or more servers receive a selection of a user for association, with the signing role.

The process 1100 then flows to block 1130, where, responsive to a network action on the electronic document, the one or more servers generate a copy of the electronic document having a tag automatically overlaid in the copy of the electronic document based on the pre-tag, the tag indicating the visible location for the user associated with the signing role to sign.

Process 1100 proceeds to block 1140, where the one or more servers transmit a web browser graphical user interface (GUI) configured to display the terms of agreement data of the copy of the electronic document and the tag indicating the visible location for the user associated with the signing role to sign to a client device, the terms of agreement data of the copy of the electronic document not being editable by the client device through the web browser GUI.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Example Computing System Implementation

Figure 10:
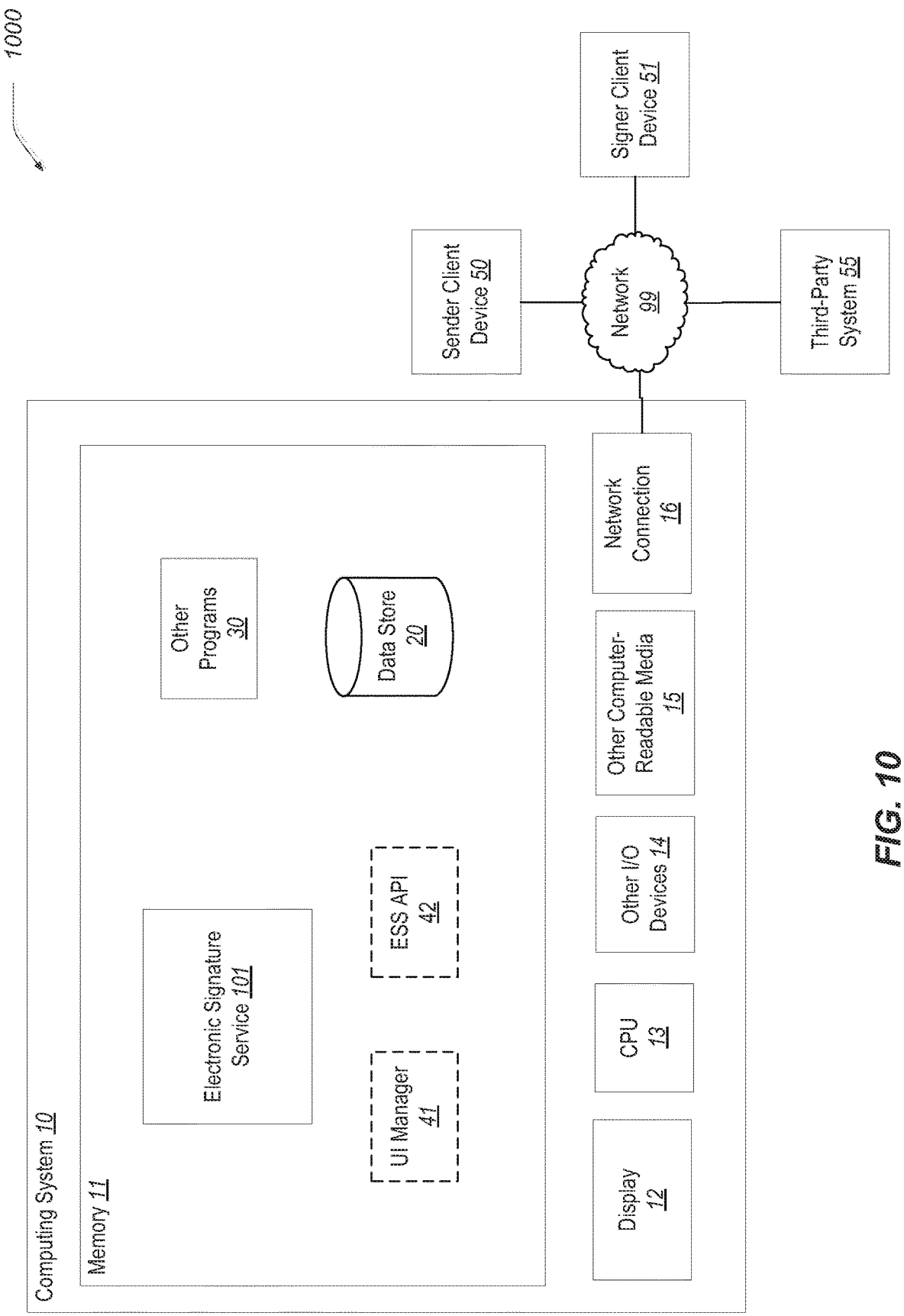
FIG. 10 is a block diagram of an example computing system for implementing example embodiments of a digital transaction service.

FIG. 10 is a block diagram of an example computing system for implementing example embodiments of a digital transaction service. In particular, FIG. 10 shows a system that includes computing system 10 that may be utilized to implement a DTS 101 (e.g., as shown in FIG. 1 or 2).

Note that one or more general-purpose or special-purpose computing systems/devices may be used to implement the DTS 101. In addition, the computing system 10 may comprise one or more distinct computing systems/devices and may span distributed locations. Furthermore, each block shown may represent one or more such blocks as appropriate to a specific embodiment or may be combined with other blocks. Also, the DTS 101 may be implemented in software, hardware, firmware, or in some combination to achieve the capabilities described herein.

In the embodiment shown, computing system 100 comprises a computer memory 11, a display 12, one or more Central Processing Units ("CPU") 13, input/output devices 14 (e.g., keyboard, mouse, LCD display, touch screen, and the like), other computer-readable media 15, and a network connection 16 connected to a network 99.

The DTS 101 is shown residing in memory 11. In other embodiments, some portion of the contents, some or all of the components of the DTS 101 may be stored on and/or transmitted over the other computer-readable media 15. The components of the DTS 101 preferably execute on one or more CPUs 13 and perform the processes described herein. Other code or programs 30 (e.g., an administrative interface, a Web server, and the like) and a data store 20, also reside in the memory 11, and preferably execute on one or more CPUs 13. Of note, one or more of the components in FIG. 10 may not be present in any specific implementation. For example, some embodiments may not provide other computer-readable media 15 or a display 12.

The DTS 101 may perform electronic signature-related functions for or on behalf of users operating a sender client device 50 and/or a signer client device 51. In one embodiment, a sender operating sender client device 50 imports (e.g., transmits, uploads, sends) a document to be electronically signed into the DTS 101. The DTS 101 securely stores the document securely in data store 20. Secure document storage may include using cryptographic techniques to detect document tampering, such as generating hashes, message digests, or the like.

A signer operating the signer client device 51 may then access, review, and sign the document stored by the DTS 101. In some embodiments, the DTS 101 transmits images or some other representation of the document to the signer client device 51, which in turn transmits an indication of the signer's signature (or intent to sign) to the DTS 101. The DTS 101 then securely stores the signer's signature in association with the document in the data store 20. After signing the document, the signer using signer client device 51 can cause the DTS 101 to provide the signed document to one or more recipients, such as via email, fax, or other mechanism.

The DTS 101 may perform other or additional functions, such as selectively copying documents based on participant actions and/or automatically tagging documents based on a pre-tagged document with signing roles, as described herein. Also, the DTS 101 may provide (e.g., transmit) code modules that can be installed on the client devices 50 and/or 51 and that are configured to integrate the client devices 50 and/or 51 with the DTS 101. As one example, the code module may be a mobile application (e.g., app) that is installed on the signer client device 51. As another example, the code module may extend the functionality of an email client or other application by adding a control (e.g., button, menu item, widget) that is configured to import, in response to selection or activation by a user, a received documents into the DTS 101.

The illustrated example DTS 101 may also interact with a user interface ("UI") manager 41 and an application program interface ("API") 42. The UI manager 41 and API 42 are shown in dashed lines to indicate that in other embodiments they may be provided by other, possibly remote, computing systems. The UI manager 41 provides a view and a controller that facilitate user interaction with the DTS 101 and its various components. For example, the UI manager 41 may provide interactive access to the DTS 101, such that users can upload or download documents for signature, review and modify documents, transmit or otherwise provide signed documents to recipients, and the like. In some embodiments, access to the functionality of the UI manager 41 may be provided via a Web server, possibly executing as one of the other programs 30. In such embodiments, a user operating a Web browser (or other client) executing on one of the client devices 50 or 51 can interact with the DTS 101 via the UI manager 41.

The API 42 provides programmatic access to one or more functions of the DTS 101. For example, the API 42 may provide a programmatic interface to one or more functions of the DTS 101 that may be invoked by one of the other programs 30 or some other module. In this manner, the API 42 facilitates the development of third-party software, such as user interfaces, plug-ins, news feeds, adapters (e.g., for integrating functions of the DTS 101 into Web applications), and the like. In addition, the API 42 may be in at least some embodiments invoked or otherwise accessed via remote entities, such as the third-party system 55, to access various functions of the DTS 101. For example, a hosted email service executing on the third-party system 55 may provide access to the electronic signature functionality of the DTS 101 via the API 42. As another example, an e-commerce site (e.g., online store) executing on the third-party system 55 may provide access to the electronic signature functionality of the DTS 101 via the API 42, such as by providing a signature control/widget configured, when selected by a user, to initiate an electronic signature process as described herein.

The data store 20 is used by the other modules of the DTS 101 to store and/or communicate information. The components of the DTS 101 use the data store 20 to record various types of information, including documents, signatures, tracked form entries, and the like. Although the components of the DTS 101 are described as communicating primarily through the data store 20, other communication mechanisms are contemplated, including message passing, function calls, pipes, sockets, shared memory, and the like.

The DTS 101 interacts via the network 99 with client devices 50 and 51, and third-party systems 55. The network 99 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 99 may be or include multiple distinct communication channels or mechanisms (e.g., cable-based and wireless). The client devices 50 and 51 include personal computers, laptop computers, smart phones, personal digital assistants, tablet computers, kiosk systems, and the like. The third-party systems 55 and client devices 50 and 51 may be or include computing systems and/or devices constituted in a manner similar to that of computing system 100, and thus may also include displays, CPUs, other I/O devices (e.g., a camera), network connections, or the like.

In an example embodiment, components/modules of the DTS 101 are implemented using standard programming techniques. For example, the DTS 101 may be implemented as a "native" executable running on the CPU 13, along with one or more static or dynamic libraries. In other embodiments, the DTS 101 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The data store 20 may be implemented as one or more database systems, file systems, or any other technique for storing such information, or any combination of the above, including implementations using distributed computing techniques. In addition, some embodiments may provide one or more interfaces to the data stored as part of the DTS 101. Such interfaces may be provided via database connectivity APIs accessed from a variety of programming languages, Web-based interfaces, file systems interfaces, or the like.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in certain embodiments, some or all of the components of the DTS 101 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored in a non-transitory manner on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method comprising:
   receiving, by one or more servers, a pre-tag-indicating a visible location within an electronic document for a signature of a signing role, the electronic document comprising terms of agreement data;
   receiving, by the one or more servers, selection of a user for association, with the signing role;
   responsive to a network action on the electronic document, generating, by the one or more servers, a copy of the electronic document having a tag automatically overlaid in the copy of the electronic document based on the pre-tag, the tag indicating the visible location for the user associated with the signing role to sign; and
   transmitting, by the one or more servers, to a client device, a web browser graphical user interface (GUI) configured to display the terms of agreement data of the copy of the electronic document and the tag indicating the visible location for the user associated with the signing role to sign, the terms of agreement data of the copy of the electronic document not being editable by the client device through the web browser GUI.

2. The method of claim 1, wherein the network action is a change to the electronic document.

3. The method of claim 2, wherein the network action is an instruction to transmit the electronic document to the user associated with the signing role.

4. The method of claim 3, wherein transmitting the web browser GUI is in response to the instruction to transmit the electronic document to the user associated with the signing role.

5. The method of claim 2, further comprising:
   generating, by the one or more servers, a history GUI comprising a list of a plurality of actions on the electronic document, the list comprising view links to a plurality of copies of the electronic document including at least a first link to the copy of the electronic document and a further link to a further copy of the electronic document that was generated in response to a further change to the electronic document;
   receiving, from the client device, a selection of one of the view links; and
   responsive to receiving the selection of one of the view links, transmitting the copy of the electronic document that corresponds to the selection.

6. The method of claim 1, further comprising: generating an assignment GUI comprising one or more input elements operable to select one of a plurality of users for association with the signing role, wherein the selection of the user being performed through the one or more input elements.

7. The method of claim 1, wherein the web browser GUI displays the copy of the electronic document in a non-editable file format such that the terms of agreement data is non-editable by the user.

8. A system, the system comprising:
   one or more processors of a machine; and
   a memory storing instructions that, when executed by the one or more processors, cause the machine to perform operations comprising:
   receive, by one or more servers, a pre-tag indicating a visible location within an electronic document for a signature of a signing role, the electronic document comprising terms of agreement data;
   receive, by the one or more servers, selection of a user for association with the signing role;
   responsive to a network action on the electronic document, generating, by the one or more servers, a copy of the electronic document having a tag automatically overlaid in the copy of the electronic document based on the pre-tag, the tag indicating the visible location for the user associated with the signing role to sign; and
   transmit, by the one or more servers, to a client device, a web browser graphical user interface (GUI) configured to display the terms of agreement data of the copy of the electronic document and the tag indicating the visible location for the user associated with the signing role to sign, the terms of agreement data of the copy of the electronic document not being editable by the client device through the web browser GUI.

9. The system of claim 8, wherein the network action is a change to the electronic document.

10. The system of claim 9, wherein the operations further comprise:
    generate, by the one or more servers, a history GUI comprising a list of a plurality of actions on the electronic document, the list comprising view links to a plurality of copies of the electronic document including at least a first link to the copy of the electronic document and a further link to a further copy of the electronic document that was generated in response to a further change to the electronic document;
    receiving, from the client device, a selection of one of the view links; and
    responsive to receiving the selection of one of the view links, transmitting the copy of the electronic document that corresponds to the selection.

11. The system of claim 8, wherein transmitting the web browser GUI is in response to the instruction to transmit the electronic document to the user associated with the signing role.

12. The system of claim 8, wherein the operations further comprise: generate an assignment GUI comprising one or more input elements operable to select one of a plurality of users for association with the signing role, wherein the selection of the user being performed through the one or more input elements.

13. The system of claim 8, wherein the web browser GUI displays the copy of the electronic document in a non-editable file format such that the terms of agreement data is non-editable by the user.

14. A non-transitory computer-readable storage medium embodying instructions that, when executed by a machine, cause the machine to perform operations comprising:
    receiving, by one or more servers, a pre-tag indicating a visible location within an electronic document for a signature of a signing role, the electronic document comprising terms of agreement data;
    receiving, by the one or more servers, selection of a user for association with the signing role;
    responsive to a network action on the electronic document, generating, by the one or more servers, a copy of the electronic document having a tag automatically overlaid in the copy of the electronic document based on the pre-tag, the tag indicating the visible location for the user associated with the signing role to sign; and
    transmit, by the one or more servers, to a client device, a web browser graphical user interface (GUI) configured to display the terms of agreement data of the copy of the electronic document and the tag indicating the visible location for the user associated with the signing role to sign, the terms of agreement data of the copy of the electronic document is not being editable by the client device through the web browser GUI.

15. The non-transitory computer-readable storage medium of claim 14, wherein the network action is a change to the electronic document.

16. The non-transitory computer-readable storage medium of claim 14, wherein the network action is an instruction to transmit the electronic document to the user associated with the signing role.

17. The non-transitory computer-readable storage medium of claim 16, wherein transmitting the web browser GUI is in response to the instruction to transmit the electronic document to the user associated with the signing role.

18. The non-transitory computer-readable storage medium of claim 14, the operations further comprising: generating an assignment GUI comprising one or more input elements operable to select one of a plurality of users for association with the signing role, wherein the selection of the user being performed through the one or more input elements.

19. The non-transitory computer-readable storage medium of claim 14, wherein the web browser GUI displays the copy of the electronic document in a non-editable file format such that the terms of agreement data is non-editable by the user.

\* \* \* \* \*